United States Patent [19]

Vreeswijk et al.

[11] Patent Number: 4,603,351

[45] Date of Patent: Jul. 29, 1986

[54] FIELD-FREQUENCY DOUBLING CIRCUIT

[75] Inventors: Franciscus W. P. Vreeswijk; Sing L. Tan, both of Eindhoven, Netherlands

[73] Assignee: U.S. Philips Corporation, New York, N.Y.

[21] Appl. No.: 771,441

[22] Filed: Aug. 30, 1985

[30] Foreign Application Priority Data

Sep. 5, 1984 [NL] Netherlands .................... 8402707

[51] Int. Cl.$^4$ .................... H04N 7/01; H04N 11/20
[52] U.S. Cl. .................... 358/140; 358/11
[58] Field of Search .................... 358/140, 105, 11

[56] References Cited

U.S. PATENT DOCUMENTS

| | | | |
|---|---|---|---|
| 4,051,531 | 9/1977 | Baldwin | 358/140 |
| 4,276,565 | 6/1981 | Dalton et al. | 358/140 |
| 4,322,750 | 3/1982 | Lord et al. | 358/140 |
| 4,435,728 | 3/1984 | Raven et al. | 358/140 |

FOREIGN PATENT DOCUMENTS 2617884  3/1977  Fed. Rep. of Germany ...... 358/140

*Primary Examiner*—James J. Groody
*Assistant Examiner*—Robert M. Bauer
*Attorney, Agent, or Firm*—Thomas A. Briody; William J. Streeter; Edward W. Goodman

[57] ABSTRACT

By providing, in a field-frequency doubling circuit comprising a converter circuit (3) of an A, A, B, B, type, an interpolation circuit (31) which combines, in an appropriate manner, the information of two subjacent lines of a first field of a picture of the television signal to be converted and a second field of a picture of the television signal to be converted, line flicker can be prevented from occurring without it being necessary to provide a movement detector and a change-over switch for an A, B, A, B-type conversion.

2 Claims, 2 Drawing Figures

4,603,351

FIELD-FREQUENCY DOUBLING CIRCUIT

BACKGROUND OF THE INVENTION

The invention relates to a field-frequency doubling circuit, comprising a converter circuit for converting an interlaced television signal, having a picture frequency of n pictures per second and a field-frequency of 2n fields per second, into a converted television signal having a field frequency of 4n fields per second, the fields of the converted television signal having substantially the same number of lines as have the fields of the interlaced television signal to be converted and every two consecutive fields of the converted television signal being equal to each other, and comprising, coupled to an output of the converter circuit, an interpolation circuit for adding together information from some of the lines of the converted television signal in each line period of the converted television signal.

U.S. Pat. No. 4,435,728, which corresponds to Netherlands Patent Application 8100603 (PHN 9947), discloses a field-frequency doubling circuit of the above-defined type, which comprises a movement detector which, in the absence of movement switches the circuit to a type of conversion in which the fields of the converted television signal alternately correspond to a first and a second field of the television signal to be converted. The interpolation proposed for the case in which there is movement, relates to combining information from two consecutive lines of a field of the converted television signal.

SUMMARY OF THE INVENTION

The invention has for its objects a circuit from which a movement detector and a change-over of the type of conversion can be omitted.

Therefore, according to the invention, a field-frequency doubling circuit of the type defined in the opening paragraph, is characterized in that the interpolation circuit comprises a change-over switch for interpolation, for each group of four fields of the converted television signal during the first and third fields of this group, between a line of the converted television signal, corresponding to a line of a first field of a picture of a television signal to be converted, and a line corresponding to a subjacent line of the second field of a picture of the television signal to be converted, and, during the second and fourth fields of this group, between a line of the converted television signal corresponding to a line of the first field and a line of the converted television signal corresponding to a superjacent line of the second field of a picture of the television signal to be converted.

When this measure is applied, it is no longer necessary to switch to a different type of conversion when there is no movement in the picture in order to eliminate not only zonal flicker but also the line flicker.

DESCRIPTION OF THE DRAWING

The invention will now be described in detail, by way of example, with reference to the accompanying drawings. In the drawing.

DESCRIPTION OF THE PREFERRED EMBODIMENT

Figure 1:
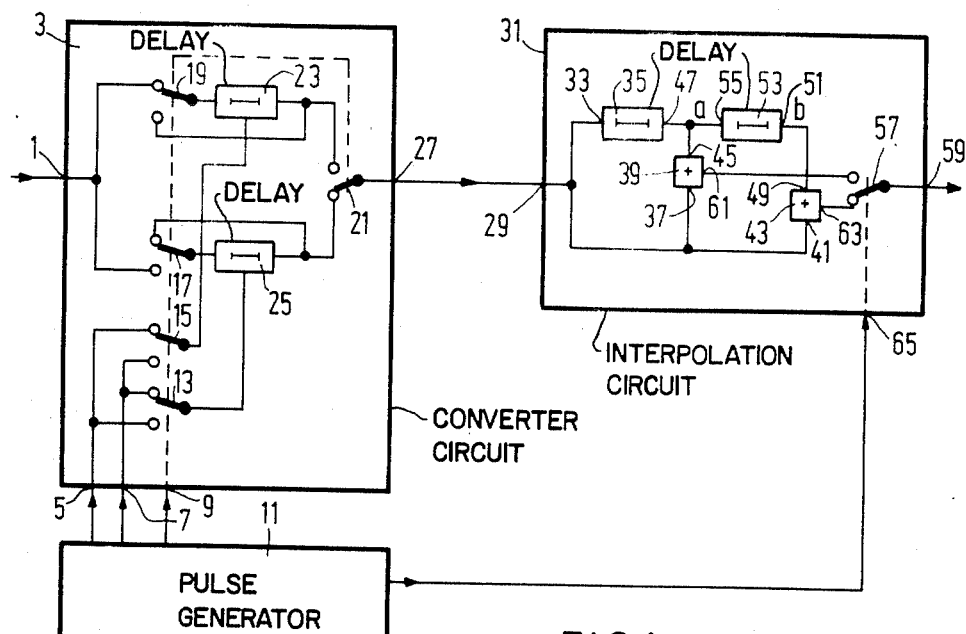
FIG. 1 illustrates, by means of a block circuit diagram, a possible embodiment of a field-frequency doubling circuit according to the invention.

In FIG. 1, a television signal to be converted is applied to an input 1 of a converter circuit 3. The converter circuit 3 has a further input 5 to which a write clock signal is applied, an input 7 to which a read clock signal, having twice the frequency of the write clock signal, is applied and an input 9 to which a switching signal is applied. These signals are produced by a pulse generator 11.

The converter circuit 3 comprises a switching arrangement 13, 15, 17, 19, 21 and two field delay lines 23, 25. In response to the switching signal applied to the input 9, a converted television signal is obtained at an output 27 of the converter circuit 3. This converted television signal is applied to an input 29 of an interpolation circuit 31.

The input 29 of the interpolation circuit 31 is connected to an input 33 of a delay line 35, producing a time delay of two field periods minus one line period of the converted television signal, to an input 37 of a first adder circuit 39 and to an input 41 of a second adder circuit 43. A further input 45 of the first adder circuit 39 is connected to an output 47 of the delay line 35 and a further input 49 of the second adder circuit 43 is connected to an output 51 of a delay line 53, producing a delay of one line period of the converted television signal.

Figure 2:
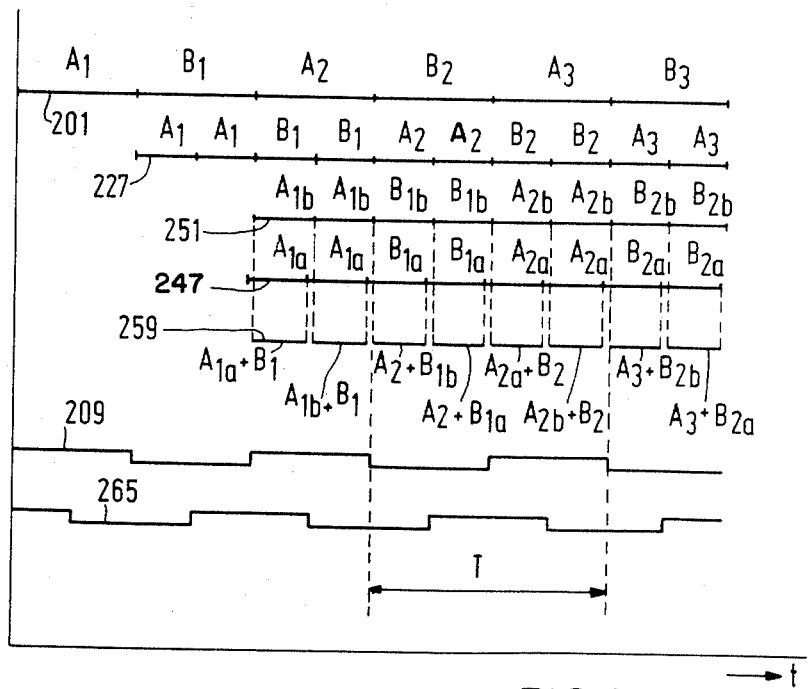
FIG. 2 is a time diagram for conversion and interpolation for the circuit of FIG. 1.

A change-over switch 57 connects an output 59 of the interpolation circuit 31 to an output 61 of the first adder circuit 39 or to an output 63 of the second adder circuit 43. The change-over switch 57 is operated by a switching signal applied to an input 65 of the interpolation circuit 31 and produced by the pulse generator 11. The operation of the circuit will now be described in detail with reference to FIG. 2. In FIG. 2 reference numerals 201, 227, 251, 247, and 259, respectively, denote the time diagram of the signals at the input 1, the output 27 of the converter circuit 3, the output 51 of the delay line 53, the output 47 of the delay line 35, and the output 59 of the interpolation circuit 31, respectively. The respective waveforms 209 and 265 represent the switching signal at the input 9 of the converter circuit 3 and at the input 65 of the interpolation circuit 31, respectively.

The fields $A_1$, $B_1$, $A_2$, $B_2$, $A_3$ and $B_3$, denoted in FIG. 2 by reference numeral 201, and which produce at the output 27 the fields $A_1$, $A_1$, $B_1$, $B_1$, $A_2$, $A_2$, $B_2$, $B_2$, $A_3$, $A_3$, denoted by 227 in FIG. 2, of the converted television signal with twice the field frequency of the television signal to be converted, occur sequentially at the input 1 of the converter circuit 3. In the television signal to be converted, the interlaced fields $A_x$ and $B_x$ form together one picture.

The signal $A_{1b}$, $A_{1b}$, $B_{1b}$, $B_{1b}$, $A_{2b}$, $A_{2b}$, $B_{2b}$, $B_{2b}$, which is denoted by reference numeral 251 in FIG. 2 and is delayed through two field periods of the converted television signal relative to the signal 227, is produced at the output 51 of the delay line 53. The signal $A_{1a}$, $A_{1a}$, $B_{1a}$, $B_{1a}$, $A_{2a}$, $A_{2a}$, $B_{2a}$, $B_{2a}$, which, relative to the signal 227, is delayed through two field periods minus one line period of the converted television signal, appears one line period of the converted television signal earlier at the output 47 of the delay line 35 than the signal 251 at the outputs 51 of the delay line 53.

In a period T corresponding to four field periods of the converted television signal, the interpolated signals ($A_2+B_{1b}$), ($A_2+B_{1a}$), ($A_{2a}+B_2$) and ($A_{2b}+B_2$), respectively, which in FIG. 2 are denoted by reference numeral 259, are obtained at the output 59 of the interpolation circuit 31. For this it holds that:

In the first field period of the period T, the lines of the field $A_2$ which occur simultaneously with the lines of the field $B_{1b}$, correspond to lines from an A-field and a B-field of the television signal to be converted, in which a corresponding line from the A-field is located above the line of the B-field.

In the second field period of period T, the lines of the field $A_2$ which occur simultaneously with those of the field $B_{1a}$, correspond to lines from an A-field and a B-field of the television signal to be converted, in which a corresponding line from the A-field is located below the line of the B-field.

In the third field period T, the lines of the field $A_{2a}$ which occur simultaneously with those of the field $B_2$, correspond to the lines from an A-field and a B-field, in which a corresponding line of the A-field is located above the line of the B-field.

In the fourth field period of the period T, the lines of the field $A_{2b}$ which occur simultaneously with those of the field $B_2$, correspond to lines of an A-field and a B-field of the television signal to be converted, in which a corresponding line of the A-field is located below the line of the B-field.

The switch 57 of the interpolation circuit 31 then is in the position shown in the drawing when the waveform 265 is in the low state and in the position not shown when the waveform 265 is in the high state.

The switching arrangement 13, 15, 17, 19, 21 of the converter circuit 3 is in the position shown when the waveform 209 is in the high state and in the position not shown when the waveform 209 is in the low state.

In the interpolation circuit 31, the first adder circuit 39 may be omitted if instead, the change-over switch 57 alternately connects the input 49 of the second adder circuit 43 to the output 51 of the delay line 53 or to the output 47 of the delay line 35.

If so desired, the delay lines 35 and 53 may be interchanged.

What is claimed is:

1. A field-frequency doubling circuit, comprising a converter circuit for converting an interlaced television signal, having a picture frequency of n pictures per second and a field frequency of 2n fields per second, into a converted television signal having a field frequency of 4n fields per second, the fields of the converted television signal having substantially the same number of lines as the fields of the interlaced television signal and every two consecutive fields of the converted television signal being equal to each other, said field-frequency doubling circuit further comprising, coupled to an output of the converter circuit, an interpolation circuit for adding together informatin from some of the lines of the converted television signal in each line period of the converted television signal, characterized in that the interpolation circuit comprises a change-over switch for interpolating, for each group of four fields of the converted television signal during a first and a third field of said group, between a line of the converted television signal corresponding to a line of a first field of a picture of the interlaced television signal, and a line of the converted television signal corresponding to a subjacent line of a second field of a picture of the interlaced television signal, and, during a second and a fourth field of said group, between a line of the converted television signal corresponding to a line of the first field of a picture of the interlaced television signal, and a line of the converted television signal, corresponding to a superjacent line of the second field of a picture of the interlaced television signal.

2. A field-frequency doubling circuit as claimed in claim 1, characterized in that the field interpolation circuit comprises a series arrangement of a delay line producing a delay of two field periods minus a line period of the converted television signal and a delay line producing a delay of one line period of the converted television signal and change-over summing means coupled to an input of said interpolation circuit and an output of each of the delay lines, with which, alternatingly, a sum of the input signal of the interpolation circuit and an output signal of each of the delay lines is obtained.

* * * * *